Patented Aug. 28, 1934

1,971,415

UNITED STATES PATENT OFFICE 1,971,415

SULPHONATION PRODUCT OF NITROGEN CONTAINING CONVERSION PRODUCTS OF HIGHER ALIPHATIC HYDROCARBONS

Karl Keller, Frankfort-on-the-Main-Fechenheim, Germany, assignor to General Aniline Works, Inc., New York, N. Y., a corporation of Delaware No Drawing. Application April 12, 1932, Serial No. 604,882. In Germany April 16, 1931

2 Claims. (Cl. 260—127)

My present invention relates to sulphonation products of nitrogen containing conversion products of higher aliphatic hydrocarbons and to a process of preparing the same.

When heating halogenated derivatives, containing at least 2 halogen atoms, of aliphatic hydrocarbons, containing at least 9 carbon atoms, particularly of technical mixtures of such hydrocarbons, as may be produced by starting from natural products or by synthesis, with ammonia in a closed vessel at a temperature between about 140° and about 190° C. mixtures of derivatives of hydrocarbons of the aliphatic series are obtained, which contain nitrogen in the form of basic groups and may contain halogen. These products represent mostly viscous oils and may be incorporated in baths used in dyeing processes.

Now I have found that by treating the said products with a sulphonating agent with or without the addition of a diluent products of technical value are obtained. According to the degree of sulphonation the products formed are either soluble only in dilute solutions of alkalies or in an alkaline and also in an acid medium.

As sulphonating agents may be used for example, concentrated sulphuric acid, monohydrate, chlorsulphonic acid and fuming sulphuric acid.

The aqueous solutions of the salts of the new products possess a good emulsifying power. They are distinguished by the particular effect of preventing the fixation of acid wool dyestuffs.

The new sulphonation products represent mostly solid substances of resin-like character, they are soluble in alkaline solutions, their alkali salts represent viscous oils, the aqueous solutions of which may be used immediately for technical purposes.

In order to further illustrate my invention the following examples are given, the parts being by weight and all temperatures in centigrade degrees; but it is however to be understood that my invention is not limited to the particular products nor reacting conditions mentioned therein.

Example 1

A hexachlorinated derivative of hard paraffin, obtainable by chlorinating hard paraffin until an increase of weight corresponding to the entrance of six chlorine atoms into the molecule of hard paraffin has occurred, is heated in a closed vessel with an alcoholic solution of ammonia for some hours at from about 140° to about 150° C. and the conversion product thus formed is isolated by removing the ammonium chloride formed by filtration and by distilling off the alcohol.

21 parts of the crude product thus obtained are dissolved in about 50 parts of trichloroethylene. After having cooled down the solution to about −10° C., 25 parts of sulphuric acid monohydrate and then 40 parts of fuming sulphuric acid containing about 30% of free sulphur-trioxide are allowed to flow in, while stirring at temperatures ranging from about −10° C. to zero, then the sulphonation mass is stirred for about half an hour and poured on ice. The oil separating from the mixture is repeatedly washed with cold water and then neutralized with a caustic soda solution at temperatures below zero. The trichloroethylene may be recovered by distillation in vacuo. The residue then remaining is diluted with hot water and the aqueous solution thus obtained may be purified by filtration. In order to obtain the free sulphonation product, the neutral solution is acidulated and the precipitated product is filtered off. When dry it represents a brownish brittle substance, which is entirely soluble in a dilute caustic alkali solution, but insoluble in dilute mineral acids.

The new product contains 4% nitrogen, 5.6% sulphur and about 15% chlorine.

Example 2

128 parts of the same starting material as used in Example 1 obtained by the action of an alcoholic ammonia solution on hexachlorhardparaffin or 120 parts of a purified product, which may be obtained by extracting the weakly alkaline solution of the hydrochloride of the raw product and precipitating the extracted solution with a caustic alkali solution, are dissolved in about 400 parts of monochlorobenzene and while stirring at from about 20° to about 40° C., slowly 98 parts of sulphuric acid monohydrate are added. The reaction mass is stirred for about an hour while increasing the temperature to about 75° C. and then subjected to a steam distillation, whereby the monochlorobenzene is recovered. When having used the crude starting material, the solution which remains after the steam distillation may be evaporized and extracted with a suitable organic diluent in order to remove neutral oily portions which are contained in a colloid state.

To the acid solution thus obtained a quantity of a concentrated caustic soda solution is added, sufficient to precipitate the reaction product.

The reaction product is separated by filtration from the alkaline salt solution, mixed with a dilute hydrochloric acid until the mixture shows only a weakly alkaline reaction. In this manner a viscous clear aqueous solution of the sulphonation product is obtained which strongly foams when agitated. This solution may be directly used for technical purposes. With acidifying the sulphonation product with an organic or inorganic acid it remains entirely dissolved. When salting out the weakly alkaline solution the sodium salt of the sulphonation product is obtained.

Similar products are obtained when decomposing dichloro-, trichloro-, tetrachloro-, pentachloro- etc. derivatives of higher paraffin hydrocarbons with ammonia and subjecting the bases thus obtained to the action of a sulphonating agent.

Example 3

Trichlorinated hard paraffin is decomposed with an alcoholic ammonia solution. To 38 parts of the base thus obtained while stirring at from about 70° to about 75° C., 10 parts of chlorosulphonic acid are added, whereby the viscosity of the reaction mass is strongly increased. After having well stirred and cooled down the mass to from about 60° C. to about 55° C. further 25 parts of chlorosulphonic acid are added consecutively during about 1-2 hours while well stirring whereby the reaction mass becomes more thinly liquid, and after having stirred once more the mass at from about 55° C. to about 60° C. it is cooled down and washed out several times with ice water. The acid washing liquor is removed in a suitable manner and the remaining reaction mass is made alkaline by adding about 13.5 parts of a caustic soda solution of 1.297 density, so that a test of the oily mass when diluted with water gives a clear solution. The brown viscous oil thus obtained contains the sodium salt of the new nitrogeneous sulphonation product. Its aqueous solution strongly foams.

I claim:—

1. Sulphonation products of nitrogen containing conversion products of higher aliphatic hydrocarbons which products represent mostly solid substances of resin-like character, being soluble in alkaline solutions, their alkali metal salts representing viscous oils, which products are obtainable by heating halogenated derivatives of hard paraffin containing at least 9 carbon atoms and at least 2 halogen atoms with an ammonia solution in a closed vessel at a temperature from about 140° C. to about 190° C. and treating the nitrogeneous conversion products thus formed with a sulphonating agent.

2. Sulphonation products of nitrogen containing conversion products of higher aliphatic hydrocarbons which products represent mostly solid substances of resin-like character, being soluble in alkaline solutions, their alkali metal salts representing viscous oils, which products are obtainable by heating mixtures of halogenated derivatives of hard paraffin containing at least 9 carbon atoms and at least 2 halogen atoms, with an ammonia solution in a closed vessel at a temperature from about 140° C. to about 190° C. and treating the nitrogeneous conversion products thus formed with a sulphonating agent.

KARL KELLER.